Patented Dec. 12, 1944

2,365,057

UNITED STATES PATENT OFFICE 2,365,057

FUNGICIDAL MATERIALS

Gerald H. Coleman and Gerald A. Griess, Midland, Mich., assignors to The Dow Chemical Company, Midland, Mich., a corporation of Michigan No Drawing. Application October 30, 1943, Serial No. 508,377

12 Claims. (Cl. 167—31)

The present invention is concerned with new fungicidal materials and is particularly directed to fungicidal compositions comprising inert diluents and as active toxic ingredients certain amine salts of halo-phenols, and to the compounds so employed.

Phenols and particularly halo-phenols and their metal salts have been widely employed as constituents of fungicidal compositions. For such operations as wood preservation and slime control, where there is no problem of injury with respect to the material treated, these compounds have been found satisfactory toxicants for controlling a wide range of bacteria and fungus organisms. In these applications, the phenolic toxicant generally has been employed in soluble form and dissolved either in water or in organic solvent such as petroleum oil, naphtha, and the like.

An entirely different situation is encountered in the provision of agricultural fungicides for use on plants, seeds, fruit, etc., where the susceptibility of the host to injury is a controlling factor in the selection of the toxicant and type of composition to be employed. Here, the indiscriminate use of free phenols and their inorganic salts is impossible because of the phytotoxic properties of such compounds whereby roots, leaves, flowers, fruit, and buds may be severely injured. Also, the solubility characteristics of the common metal salts of phenols are not favorable where it is desired to maintain the toxicant in contact with or adjacent to the area of infestation. Rain, heavy dew, subsequent spraying, or irrigation rapidly disperses such toxicant whereby its continued effect is lost. A similar failure on the part of the free phenols to provide protection over an extended period of time frequently is attributable to their high volatility. It is apparent therefore that many of the substances commonly employed in fungicidal practice are not adaped for use in those situations which involve contact with plant tissue or where a prolonged effect is desired.

In the selection of toxicants for general fungicidal use, and more particularly agricultural application, it is desirable that materials be chosen which have such properties as not to be rapidly dissipated from the point of application whereby the development and growth of bacteria and fungus organisms is controlled over a long period of time. It is also desirable that the chosen toxicant be non-corrosive to growing plants and relatively innocuous to humans.

We have discovered that improved fungicidal compositions are obtained when an inert diluent is compounded with certain amine salts of halo-phenols. These salts are in themselves novel and are characterized by the following formula:

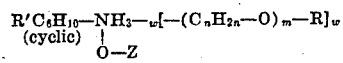

wherein R represents an aromatic radical of the benzene series, R' represents an alkyl radical of from 1 to 8 carbon atoms, inclusive, phenyl, cyclohexyl, or hydrogen, $w$ is an integer not greater than 2, $m$ is an integer not greater than 4, $n$ is an integer from 2 to 4, inclusive, and Z is a halo-aromatic radical of the benzene series characterized by having at least one halogen atom directly attached to the oxygenated benzene ring. Preferred embodiments of the invention include fungicidal compositions embodying compounds of the above formula wherein $R'C_6H_{10}-$ represents cyclohexyl, R represents a chlorophenyl radical, Z represents a polychlorophenyl radical, and $n$ is 2.

The expression "of the benzene series," as applied to aromatic and halo-aromatic radicals, refers to mononuclear aromatic structures characterized by the phenyl ring

and homologues and analogues thereof in distinction to heterocyclic structures and condensed polynuclear radicals containing several benzene nuclei linked together in such a manner that each pair possesses two carbon atoms in common, as in naphthyl, phenanthryl, etc.

The new amine salts, as described in the foregoing formula, are either crystalline or viscous resinous compounds and are all characterized by being less than 0.02 per cent soluble in water at 25° C. This property, coupled with the low volatility of the compounds, renders deposits thereof in or on bacteria and fungus infested surfaces persistent and not inclined to be leached out by water or otherwise dissipated. The toxic effect exerted by compositions containing these salts in mixture with inert diluents is thereby extended over an appreciable period. Also, the new salt compounds are substantially less toxic to growing vegetation than are the corresponding free phenols or their metallic salts. The compounds and compositions in which they are employed are very effective against a wide range of organisms. This would appear to result from the association in a single molecule of two phenoxy groupings, as represented by Z—O— and R—O—, and the highly substituted cyclohexyl-ammonium radical.

The compounds as set forth above may be employed generally as toxicants in fungicidal mixtures. They may be used as constituents of either dusting or spraying compositions. Thus, they may be compounded with various finely-divided inert diluents such as diatomaceous earth, bentonite, talc, sulfur, wood flours, inorganic phosphates, clays, and the like, to form dusts adapted to be applied to plants or other fungus infected objects and surfaces with standard dusting equipment, or otherwise applied as in the resulting dust (0.5 pound of toxicant) and 0.25 pound of sodium lauryl sulfate were then dispersed in 100 gallons of water and the resulting spray composition applied directly to bean foliage for the control of mildew. The results obtained with representative salt compounds when employed in this manner are summarized in the following table:

Table

| Compound | Pounds per 100 gallons | Percent effectiveness |
|---|---|---|
| Beta-(2.4.6-trichlorophenoxy)-beta'-cyclohexylamino-diethyl ether salt of pentachlorophenol | 0.5 | 100 |
| N-[2-(2-cyclohexylphenoxy)-ethyl] cyclohexylamine salt of 2.4.6-trichlorophenol | 0.5 | 100 |
| N-[2-(2-xenoxy)-ethyl] 2-methyl-cyclohexylamine salt of 2.4.5-trichlorophenol | 0.5 | 93 |
| N.N-di-[2-(4-chlorophenoxy)-ethyl] cyclohexylamine salt of pentachlorophenol | 0.5 | 100 |
| N-[3-(4-tertiarybutylphenoxy)-2-methyl-propyl] cyclohexylamine salt of 2-hydroxy-3.5.x-trichloro-diphenyl | 0.5 | 93 |
| Beta-(4-cyclohexylphenoxy)-beta'-cyclohexylamino-diethyl ether salt of 2-hydroxy-3.5.x-trichloro-diphenyl | 0.5 | 93 |
| N-[3-(4-chlorophenoxy)-2-methyl-propyl] cyclohexylamine salt of 2.3.4.6-tetrachlorophenol | 0.5 | 100 |
| Beta-(4-chlorophenoxy)-beta'-cyclohexylamino-diethyl ether salt of 2.3.4.6-tetrachlorophenol | 0.5 | 98 |
| N-[3-(4-tertiarybutylphenoxy)-2-methyl-propyl] cyclohexylamine salt of 2.3.4.6-tetrachlorophenol | 1.0 | 100 |
| N.N-di-[2-(4-chlorophenoxy)-ethyl] cyclohexylamine salt of 2.3.4.6-tetrachlorophenol | 1.5 | 100 |
| Beta-phenoxy-beta'-cyclohexylamino-diethyl ether salt of 2.3.4.6-tetrachlorophenol | 1.0 | 100 |
| N-[2-(4-chlorophenoxy)-ethyl] cyclohexylamine salt of 2.3.4.6-tetrachlorophenol | 0.5 | 97 | seed disinfection, etc. If desired, such dusts may be employed as concentrates and subsequently diluted with additional finely-divided carrier, or suspended in water or other inert liquid diluent to form sprays. The amine addition salts may also be incorporated with various wetting, dispersing, and sticking agents, and subsequently diluted to produce spray or dust compositions in which the salt is present in any desired concentration.

In the preparation of concentrates, from about 5 to about 80 per cent of the amine salt is commonly employed. The concentration of the salt in the ultimate spray or dust composition is generally between about 0.01 per cent and 10.0 per cent by weight. For seed disinfection and other general fungicidal use the concentration of the toxicant may run as high as 80 per cent. The composition type in which the salt is employed and the concentration thereof in the final composition are dependent upon the particular bacteria or fungi to be controlled and the circumstances under which such control is to be accomplished.

In other embodiments of the invention the amine salts may be employed in combination with oil emulsions. They may also be employed in water suspension with or without an additional emulsifying, wetting, or dispersing agent. The amine salt may similarly be incorporated in other standard type fungicidal and bactericidal compositions either as the sole toxic ingredient of such mixture or in combination with such materials as inorganic pigments, organic dyes, sulfur, copper sprays, and the like.

The several examples are illustrative with respect to the particular compounds, composition types, and concentrations employed, but are not to be construed as limiting the invention.

EXAMPLE 1

A series of determinations were carried out in which a number of the amine salt compounds were dispersed on a diatomaceous earth product marketed as "Celite" and employed in aqueous dispersion for the control of bean mildew on bean foliage. In a representative preparation, 20 parts by weight of N-[2-(4-chlorophenoxy)-ethyl] cyclohexylamine salt of 2.3.4.6-tetrachlorophenol was dissolved in acetone and this solution used to moisten 80 parts by weight of the diatomaceous earth. The wet product was mixed and thereafter air-dried to remove acetone. 2.5 pounds of

EXAMPLE 2

In a similar fashion, dust concentrates comprising the amine salts were compounded to form spray compositions and applied to apple foliage for the control of apple scab. In a representative determination the N-[2-(4-chlorophenoxy)-ethyl] cyclohexylamine salt of 2.3.4.6-tetrachlorophenol at 0.5 pound per 100 gallons of spray was 85 per cent effective without injury to the apple foliage.

EXAMPLE 3

Other determinations were carried out in which the dust concentrates were dispersed in water along with 0.5 pound of sodium lauryl sulfate per 100 gallons and applied for the control of snapdragon rust on snapdragons. When employed in the amount of 1.0 pound per 100 gallons the N-[3-(4 - tertiarybutyl-phenoxy) - 2 - methyl-propyl] cyclohexylamine salt of 2.3.4.6-tetrachlorophenol was 88 per cent effective.

EXAMPLE 4

1 part by weight of N-[2-(4-chlorophenoxy)-ethyl] cyclohexylamine salt of 2.3.4.6-tetrachlorophenol was dissolved in acetone and deposited on 99 parts by weight of pyrophyllite (sold as "Pyrax"). This mixture was dried and the resulting finely-divided composition applied as a dust for the control of a Fomes annosus type organism. This treatment gave 100 per cent control of the organism in a series of three separate determinations.

EXAMPLE 5

10 parts by weight of the N-[2-(4-chlorophenoxy)-ethyl] cyclohexylamine salt of 2.3.4.6-tetrachlorophenol and 5 parts by weight of sodium oleate were dissolved in methanol and the resulting solution used to wet 85 parts by weight of "loom kiln" talc. The wet product was thoroughly mixed and thereafter dried to obtain a dust composition adapted to be employed in the disinfection of seeds. In representative operations this finely-divided material was applied to corn and beans in the amount of 2 ounces per bushel by shaking the seed with the indicated amount of fungicidal mixture. The seeds were then planted in disease-infested soil and the percentage emergence of the treated seed compared with that of untreated seed. The emergence on the treated corn was 70 per cent. The emergence of corn in the control plot was only 49 per cent. With beans the percentage emergence was 70 per cent for the treated seed and only 20 for the untreated.

EXAMPLE 6

Dusting compositions comprising the amine salts of halo-phenols as toxic ingredients are illustrated by the following:

| Compound | Parts by weight |
| --- | --- |
| COMPOSITION A | |
| N-[2-(2.4-dichlorophenoxy)-propyl] 4-tertiary-butylcyclohexylamine salt of 2.4.6-tribromophenol | 3 |
| Sulfur | 97 |
| COMPOSITION B | |
| N-[2-(4-bromophenoxy)-ethyl] cyclohexylamine salt of 4-iodophenol | 5 |
| Walnut shell flour | 95 |
| COMPOSITION C | |
| Gamma-(4-chlorophenoxy)-gamma'-(4-cyclohexylcyclohexylamino)-dipropyl ether salt of pentachlorophenol | 3 |
| Pyrethrum | 0.1 |
| Diatomaceous earth | 96.9 |
| COMPOSITION D | |
| Beta-[2-(2-cyclohexylphenoxy)-ethoxy]-beta'-(4-phenylcyclohexylamino)-diethyl ether salt of 2.4.5-trichlorophenol | 3 |
| Sulfur | 12 |
| Diatomaceous earth | 85 |
| COMPOSITION E | |
| N.N-di-[2-(2-(2-phenoxy-ethoxy)-ethoxy)-ethyl] cyclohexylamine salt of pentachlorophenol | 5 |
| Red talc | 95 |

The above and related compositions may be applied with standard dusting equipment for the control of bean mildew, apple scab, snapdragon rust, tomato leaf spot, and other fungus organisms. Similarly, they are adapted to be used for the control of brown rot and other bactericidal organisms commonly attacking plant tissue.

EXAMPLE 7

The following are representative of compositions adapted to be employed as general fungicidal materials, preferably as constituents of aqueous spray mixtures.

| Compound | Parts by weight |
| --- | --- |
| COMPOSITION F | |
| Beta-[2-(2-xenoxy)-ethoxy]-beta'-[2-(cyclohexylamino)-ethoxy]-diethyl ether salt of 2-phenyl-monochlorophenol | 10 |
| Pine oil | 40 |
| Sodium salt of sulfonated sperm oil | 50 |
| COMPOSITION G | |
| N-[2-(2-benzyl-phenoxy)-ethyl]4-tertiaryoctylcyclohexylamine salt of 2.4.6-trichlorophenol | 10 |
| Bentonite | 85 |
| Sodium lauryl sulfate | 5 |

The foregoing compositions may be diluted with water to obtain spray mixtures adapted to be applied for the disinfection of stables, chicken yards, soil adjacent to growing plants, and the like.

The new chemical compounds to be applied according to the foregoing examples are readily prepared by warming together a free halo-phenol and a suitable amine. If desired, such reaction can be carried out in an inert organic solvent for the reactants. The temperature of reaction is not critical although best results are obtained at temperatures between about 30° C. and the decomposition temperature of the reactants and amine salt product. The reaction is preferably carried out by adding one of the reactants portionwise to the other with stirring and thereafter heating, if necessary, to bring about the salt formation. The crude reaction products so obtained are adapted to be employed as constituents of fungicidal and bactericidal compositions without further purification. However, the majority of the salts are crystalline in nature and are readily isolated in substantially clear form by crystallization from benzene, toluene, alcohol, or other suitable organic solvent.

Where it is desired to impregnate solid carriers with the amine salt, the carrier may be introduced into the salt reaction mixture and the phenolate precipitated directly in and on the carrier surfaces. An alternate procedure consists of first wetting a solid finely-divided carrier with one of the toxicants, e. g. the halo-phenol, dissolved in a suitable organic solvent and thereafter contacting the mixture with a solution of the second reactant, e. g. the amine, to produce the desired compound in situ.

The following examples are illustrative of the preparation of our new amine salts:

EXAMPLE 8—N-[3-(4-CHLOROPHENOXY)-2-METHYL-PROPYL] CYCLOHEXYLAMINE SALT OF 2.3.4.6-TETRACHLOROPHENOL 11.6 grams (0.05 mole) of 2.3.4.6-tetrachlorophenol and 14.1 grams (0.05 mole) of N-[3-(4-chlorophenoxy)-2-methyl-propyl] cyclohexylamine were mixed together. Heat of reaction was evolved, and the resultant viscous material was warmed on a hot plate to form a free-flowing brown liquid. This product was cooled to obtain a quantitative yield of the N-[3-(4-chlorophenoxy)-2-methyl-propyl] cyclohexylamine salt of 2.3.4.6-tetrachlorophenol as a resinous solid, soluble in 95 per cent ethyl alcohol, carbon tetrachloride, and hot kerosene, and insoluble in cold kerosene. At 25° C. this compound was soluble in water to the extent of only 0.0078 gram per 100 grams of solution. The saturated aqueous solution had a pH of 6.58 at 24.6° C.

EXAMPLE 9—N.N-DI-[2-(4-CHLOROPHENOXY)-ETHYL] CYCLOHEXYLAMINE SALT OF PENTACHLOROPHENOL 40.8 grams (0.1 mole) of N.N-di-[2-(4-chlorophenoxy)-ethyl] cyclohexylamine dissolved in 25 milliliters of hot benzene was added portion-wise and with stirring to a solution of 26.7 grams (0.1 mole) of pentachlorophenol in 40 milliliters of hot benzene. Heat of reaction was evolved and a dark green color developed in the reaction mixture. Upon stirring and cooling a heavy crop of light green crystals precipitated. These were separated by filtration, washed with cold benzene, and air-dried to obtain 63.5 grams of the N.N-di-[2-(4-chlorophenoxy)-ethyl] cyclohexylamine salt of pentachlorophenol as white crystals melting at 137°–140° C. This salt was soluble in carbon tetrachloride, hot kerosene, and hot 95 per cent ethyl alcohol. In water at 25° C., the compound was soluble to the extent of 0.0124 gram per 100 grams of solution. The saturated aqueous solution had a pH of 6.48 at 34.5° C.

EXAMPLE 10—BETA - (2.4.6 - TRICHLOROPHENOXY) - BETA'-CYCLOHEXYLAMINO-DIETHYL ETHER SALT OF PENTACHLOROPHENOL 26.7 grams (0.1 mole) of pentachlorophenol and 36.7 grams (0.1 mole) of beta-(2.4.6-trichlorophenoxy)-beta'-cyclohexylamino-diethyl ether were mixed together with stirring. Heat was evolved from the mixture, and the pentachlorophenol partially dissolved in the amine. 30 milliliters of benzene was added to the mixture, and the latter warmed and stirred to form a dark colored solution. Thus crude product was cooled for 15 hours, filtered, and the residue washed with benzene and air-dried to obtain 33 grams of the beta-(2.4.6-trichlorophenoxy) beta' - cyclohexylaminodiethyl ether salt of pentachlorophenol as a white crystalline compound melting at 120°–122° C. This salt was soluble in carbon tetrachloride and kerosene and slightly soluble in 95 per cent ethyl alcohol. At 25° C. the compound had a water solubility of 0.0211 gram per 100 grams of solution. The saturated aqueous solution had a pH of 6.62 at 34.5° C.

EXAMPLE 11—N - [2 - (2 - XENOXY) - ETHYL] 2-METHYLCYCLOHEXYLAMINE SALT OF 2.4.5-TRICHLOROPHENOL 19.8 grams (0.1 mole) of 2.4.5-trichlorophenol and 30.9 grams (0.1 mole) of N-[2-(2-xenoxy)-ethyl] 2-methylcyclohexylamine were mixed together and warmed to obtain a light yellow liquid reaction product. Upon cooling and standing for 48 hours a quantitative yield of the N-[2-(2-xenoxy)-ethyl] 2-methylcyclohexylamine salt of 2.4.5-trichlorophenol was obtained as a golden yellow viscous syrup soluble in ethyl alcohol, carbon tetrachloride, and kerosene. In water at 25° C. this compound was soluble to the extent of 0.015 gram per 100 grams of solution. The saturated aqueous solution had a pH of 6.66 at 30.8° C.

In a similar fashion other amines and phenols may be substituted for those shown above to obtain other amine salt compounds of which the following are representative:

N-[3-(4-tertiarybutylphenoxy)-2-methyl-propyl] cyclohexylamine salt of 3.5.x-trichloro-2-hydroxy-diphenyl, a white crystalline compound melting at 75°–78° C. This salt is soluble in 95 per cent ethanol, carbon tetrachloride, and kerosene. Its solubility in water at 25° C. is 0.0129 gram per 100 grams of solution. The pH of the saturated aqueous solution is 6.68 at 34.5° C.

N-[2-(2-cyclohexylphenoxy)-ethyl] cyclohexylamine salt of 2.4.6-trichlorophenol, a white crystalline compound melting at 128°–130° C. and soluble in carbon tetrachloride, kerosene, and hot 95 per cent ethyl alcohol. This compound is soluble in water at 25° C. to the extent of 0.0198 gram per 100 grams of solution. A saturated aqueous solution at 34.5° C. had a pH of 6.65.

Beta-(2-cyclohexylphenoxy) - beta' - cyclohexylamino-diethyl ether salt of 3.5.x-trichloro-2-hydroxy-diphenyl, a tacky resin-like material soluble in carbon tetrachloride, kerosene, and hot 95 per cent ethyl alcohol. This compound is soluble in water to the extent of 0.0222 gram per 100 grams of solution at 25° C. A saturated aqueous solution at 30.8° C. had a pH of 6.32.

Beta-phenoxy-beta'-cyclohexylamino - diethyl ether salt of 2.3.4.6-tetrachlorophenol, a white crystalline compound melting at 102°–103° C. and soluble in 95 per cent ethyl alcohol, carbon tetrachloride, and hot kerosene. The water solubility of this salt at 25° C. was 0.0118 gram per 100 grams of solution. At this temperature the saturated solution had a pH of 6.83.

Beta-(4 - chlorophenoxy) - beta' - cyclohexylamino-diethyl ether salt of 2.3.4.6-tetrachlorophenol, a white crystalline compound melting at 102°–106° C. and soluble in water at 25° C. to the extent of 0.0058 gram per 100 grams of solution. The saturated aqueous solution had a pH of 6.38. The compound is soluble in carbon tetrachloride, 95 per cent ethyl alcohol, and hot kerosene.

N-[3 - (4 - tertiarybutylphenoxy) - 2 - methylpropyl] cyclohexylamine salt of 2.3.4.6-tetrachlorophenol, a white crystalline compound melting at 137°–140° C. and soluble in carbon tetrachloride, kerosene, and 95 per cent ethyl alcohol. This salt is soluble in water to the extent of 0.0038 gram per 100 grams of solution at 25° C. At this same temperature the pH of the saturated aqueous solution was 6.34.

N-[2-(4 - chlorophenoxy) - ethyl] cyclohexylamine salt of 2.3.4.6-tetrachlorophenol, a crystalline compound melting at 104°–105° C. and soluble in 95 per cent ethanol, kerosene, carbon tetrachloride, and benzene. The solubility of the salt in water at 25° C. was 0.0091 gram per 100 grams of solution. This saturated solution had a pH of 6.73.

N.N-di-[2-(4-chlorophenoxy)-ethyl] cyclohexylamine salt of 2.3.4.6-tetrachlorophenol, a pale yellow crystalline compound melting at 99°–101° C. and soluble in carbon tetrachloride, 95 per cent ethyl alcohol, and hot kerosene. The salt was soluble in water at 25° C. to the extent of 0.0051 gram per 100 grams of solution. The pH of a saturated aqueous solution of the compound at 32° C. was 5.46.

The amine salts of the halophenols described above are relatively non-toxic to humans as compared with many inorganic fungicides containing lead, mercury, cyanide, copper, etc., as at present employed. They are non-explosive and difficultly flammable. Numerous instances in which they have been contacted with the skin of humans indicate that they are relatively non-corrosive and not inclined to produce dermatitis.

We claim:

1. A fungicidal composition comprising an inert diluent and as an active ingredient a compound of the formula

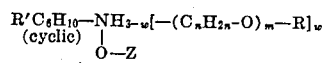

wherein R represents an aromatic radical of the benzene series, R' is selected from the class consisting of alkyl radicals containing from 1 to 3 carbon atoms, inclusive, phenyl, cyclohexyl, and hydrogen radicals, w is an integer not greater than 2, m is an integer not greater than 4, n is an integer from 2 to 4, inclusive, and Z is a halo-aromatic radical of the benzene series having at least one halogen atom directly attached to the oxygenated benzene ring.

2. A fungicidal composition comprising an inert diluent and as an active ingredient a compound of the formula

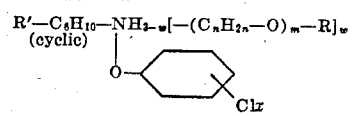

wherein R represents an aromatic radical of the benzene series, R' is selected from the group consisting of alkyl radicals containing from 1 to 8 carbon atoms, inclusive, phenyl, cyclohexyl, and hydrogen radicals, $w$ is an integer not greater than 2, $m$ is an integer not greater than 4, $n$ is an integer from 2 to 4, inclusive, and $x$ is an integer not greater than 5.

3. A fungicidal composition comprising an inert diluent and as an active ingredient a compound of the formula

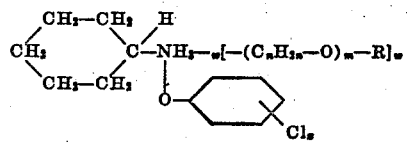

wherein R represents an aromatic radical of the benzene series, $w$ is an integer not greater than 2, $m$ is an integer not greater than 4, $n$ is an integer from 2 to 4, inclusive, and $x$ is an integer not greater than 5.

4. A fungicidal composition comprising an inert diluent and as an active ingredient a compound of the formula

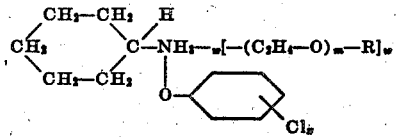

wherein R represents an aromatic radical of the benzene series, $w$ is an integer not greater than 2, $m$ is an integer not greater than 4, and $x$ is an integer not greater than 5.

5. A fungicidal composition comprising an inert diluent and as an active ingredient a compound of the formula

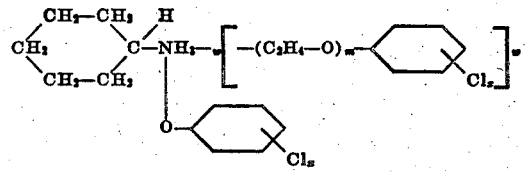

wherein $w$ is an integer not greater than 2, $m$ is an integer not greater than 4, and $x$ is an integer not greater than 5.

6. A fungicidal composition comprising an inert diluent and as an active ingredient a compound of the formula

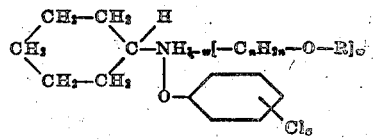

wherein R represents an aromatic radical of the benzene series, $w$ is an integer not greater than 2, $n$ is an integer from 2 to 4, inclusive, and $x$ is an integer not greater than 5.

7. A fungicidal composition comprising an inert diluent and as an active ingredient a compound of the formula

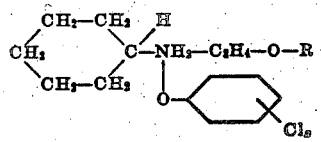

wherein R represents an aromatic radical of the benzene series, and $x$ is an integer not greater than 5.

8. A fungicidal composition comprising an inert diluent and as an active ingredient a compound of the formula

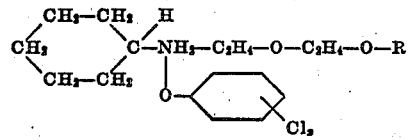

wherein R represents an aromatic radical of the benzene series, and $x$ is an integer not greater than 5.

9. A fungicidal composition comprising an inert diluent and as an active ingredient a compound of the formula

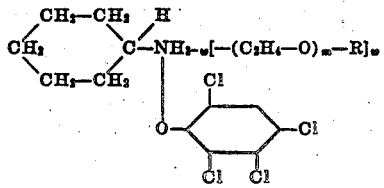

wherein R represents an aromatic radical of the benze series, $w$ is an integer not greater than 2, and $m$ is an integer not greater than 4.

10. A fungicidal composition comprising an inert diluent and as an active ingredient a compound of the formula

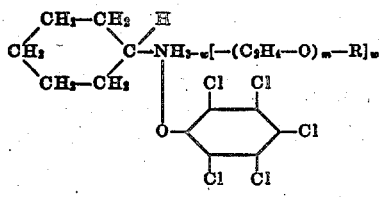

wherein R represents an aromatic radical of the benzene series, $w$ is an integer not greater than 2, and $m$ is an integer not greater than 4.

11. A fungicidal composition comprising an inert diluent and as an active ingredient a compound of the formula

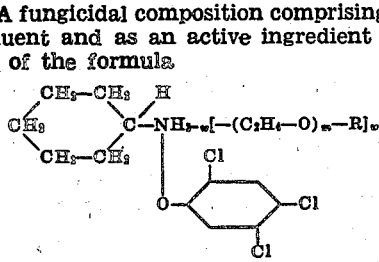

wherein R represents an aromatic radical of the benzene series, $w$ is an integer not greater than 2, and $m$ is an integer not greater than 4.

12. An amine salt of a halophenol having the formula

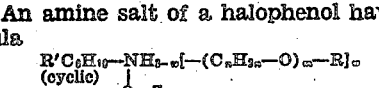
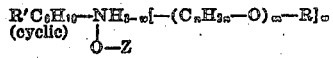

wherein R represents an aromatic radical of the benzene series, R' is selected from the class consisting of alkyl radicals containing from 1 to 8 carbon atoms, inclusive, phenyl, cyclohexyl, and hydrogen radicals, $w$ is an integer not greater than 2, $m$ is an integer not greater than 4, $n$ is an integer from 2 to 4, inclusive, and Z is a haloaromatic radical of the benzene series having at least one halogen atom directly attached to the oxygenated benzene ring.

GERALD H. COLEMAN.
GERALD A. GRIESS.